United States Patent [19]

White, Jr. et al.

[11] Patent Number: 5,194,108
[45] Date of Patent: Mar. 16, 1993

[54] ADHESIVE BACKED MOUNT INSTALLATION TOOL

[75] Inventors: Frederick E. White, Jr., Marietta, Ga.; John J. Bulanda, New Lenox, Ill.

[73] Assignee: Panduit Corp., Tinley Park, Ill.

[21] Appl. No.: 701,399

[22] Filed: May 15, 1991

[51] Int. Cl.$^5$ ............................................. B32B 31/00
[52] U.S. Cl. ...................................... 156/71; 156/579; 29/278; 174/158 R; 174/168
[58] Field of Search ............ 156/71, 91, 92, 579; 206/344; 174/72 A, 135, 117 A, 158 R, 168; 81/429, 468; 29/270, 278, 225, 227; 296/214; 30/367

[56] References Cited

U.S. PATENT DOCUMENTS

| | | | |
|---|---|---|---|
| 2,384,707 | 9/1945 | Sweet | 30/367 |
| 2,704,302 | 3/1955 | Budd | 174/168 |
| 4,268,927 | 5/1981 | Bridwell | 30/367 X |
| 4,462,285 | 7/1984 | Wiltshire | 81/468 |
| 4,508,254 | 4/1985 | Fujiwara | 156/579 X |
| 4,583,287 | 4/1986 | McDevitt et al. | 29/278 X |

*Primary Examiner*—Michael W. Ball
*Assistant Examiner*—Mark A. Osele

[57] ABSTRACT

The method of applying an adhesive backed mount to a surface comprises the steps of positioning a mount on an application tool, positioning the mount in its desired location on the desired surface and applying a force to the application tool sufficient to overcome a predetermined force requied to cycle the tool.

The tool has means for holding the mount on the tool. The tool additionally has means for applying a predetermined force to the mount and means for indicating to the operator that the predetermined force has been applied. The tool also has means for transmitting indicia to the mount indicating that the predetermined force has been applied by the tool to the mount.

2 Claims, 3 Drawing Sheets

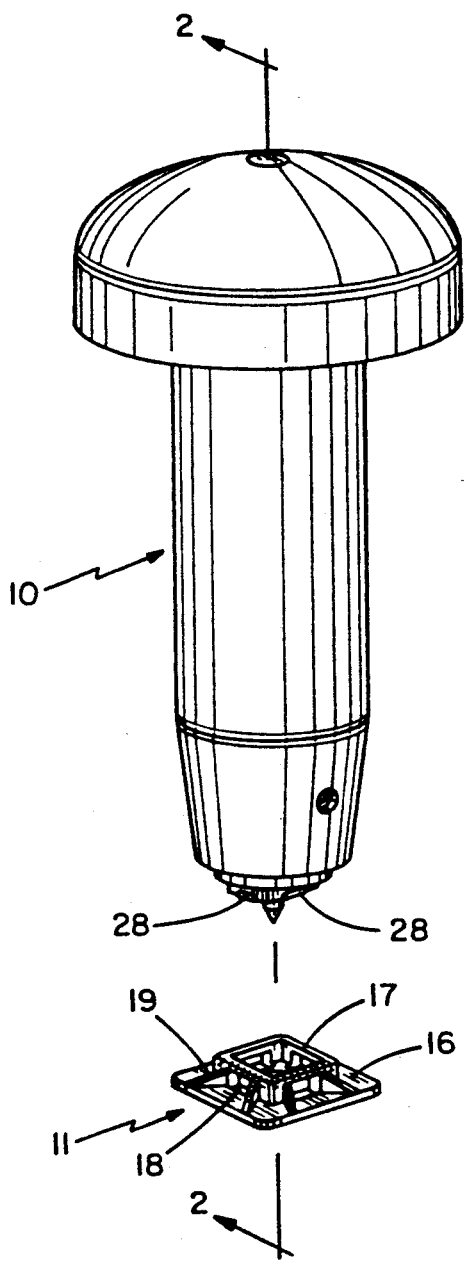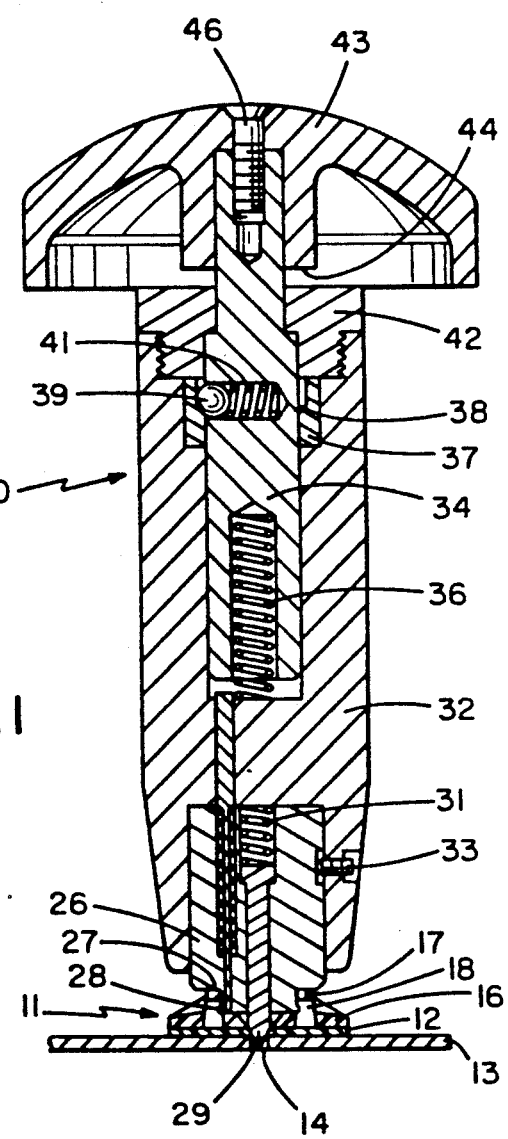

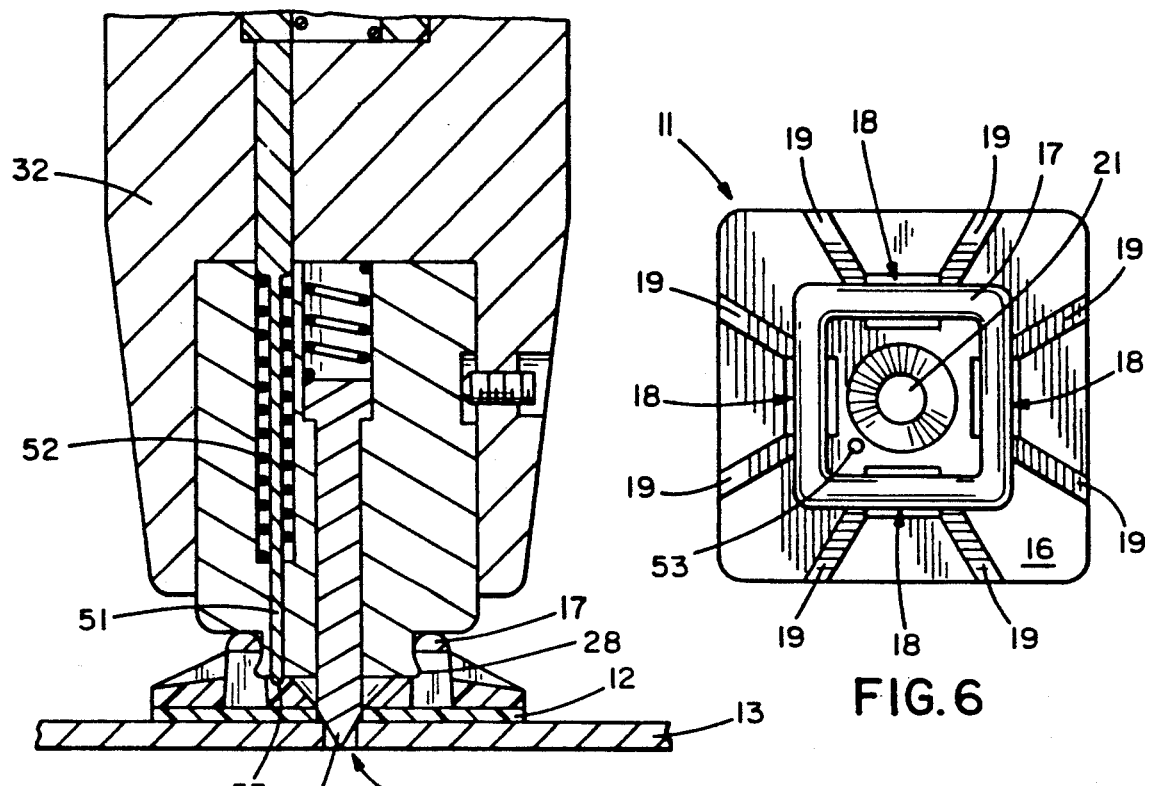
FIG. 5
FIG. 6
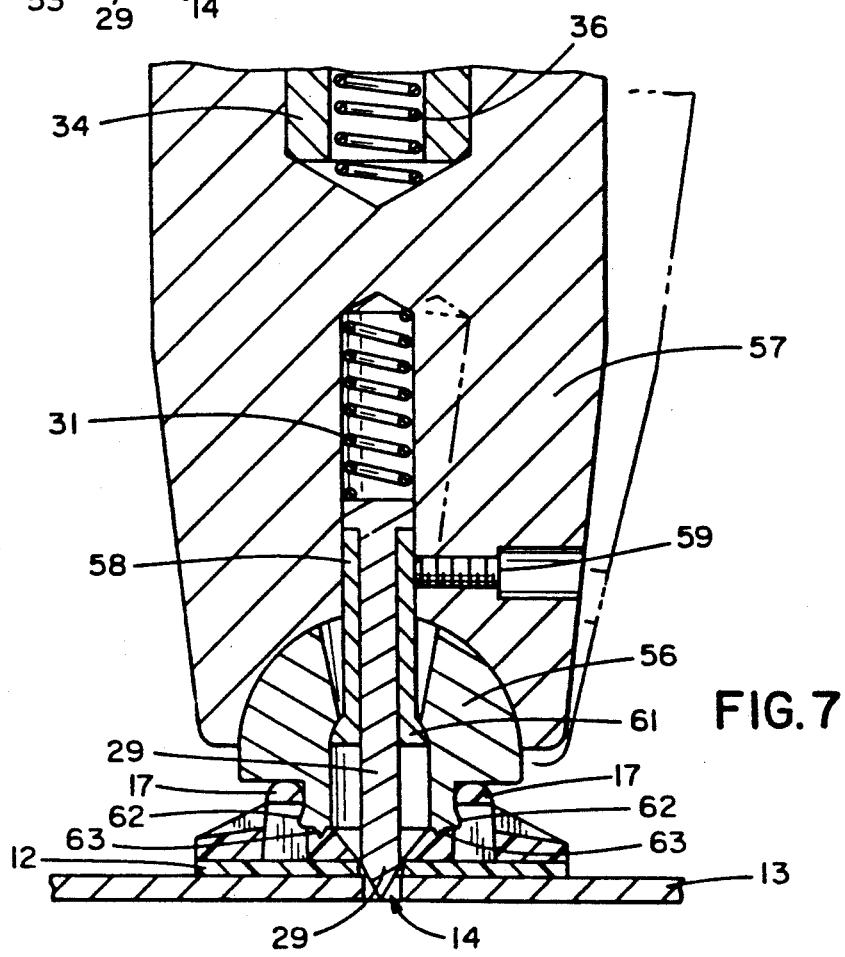
FIG. 7

ADHESIVE BACKED MOUNT INSTALLATION TOOL

TECHNICAL FIELD

The present invention relates to a method of applying an adhesive backed mount to a surface and an installation tool for providing a predetermined force to the mount during application thereof.

BACKGROUND ART

Adhesive backed mounts are used to secure a cable tie to the mount for holding cords, tubes or wires on any surface where it is desired to run such cords, tubes and wires. In the past such mounts have been applied by hand, utilizing the installer's hand to apply pressure to the mount and seat the adhesive to the surface. Additionally, it has been proposed to utilize a pneumatic impact tool to apply a pressure to the mount. In such installations there is no guarantee that the force of the tool is totally applied to the mount since the reaction force causes a recoil of the operator's hand and there is no determination as to the amount of force that is applied to the mount as opposed to that applied to the operator when the tool recoils from the mount. The utility of an adhesive backed mount is totally dependent upon proper installation and presently there is no known method of determining whether a mount has been properly installed. Without proper installation the adhesive backed mount may fail causing wires to be displaced from their intended position.

DISCLOSURE OF THE INVENTION

It is an object of the present invention to provide a method of applying an adhesive backed mount to a surface wherein a predetermined force is applied to the mount over a time period compatible with the force and time required to properly seat the adhesive on the mount to the surface to which the mount is applied. Another object of the present invention is to provide a tool having means for applying a predetermined force to the mount. A further object of the present invention is to provide means for indicating to the operator of the tool that the predetermined force has been applied to the mount. An additional object of the present invention is to provide means for transmitting indicia to the mount to indicate that the predetermined force has been applied. Yet another object of the present invention is to provide means for holding the mount in position relative to a tool prior to positioning the mount on the desired surface.

The above and additional objects are accomplished by providing a tool having means for holding a mount in position relative to the tool prior to positioning the mount on the desired surface. The tool additionally has means for applying a predetermined force to the mount and means for indicating to the operator that the predetermined force has been applied. The tool also has means for transmitting indicia to the mount indicating that the predetermined force has been applied by the tool to the mount. The method of applying an adhesive backed mount to a surface comprises the steps of positioning a mount on an application tool, positioning the mount in its desired location on the desired surface and applying a force to the application tool sufficient to overcome a predetermined force required to cycle the tool.

BRIEF DESCRIPTION OF THE DRAWINGS

FIG. 1 is an isometric view of the adhesive backed mount installation tool and an adhesive backed mount in spaced relationship thereto prior to connecting the tool to the mount.

FIG. 2 is a cross section of the tool in FIG. 1 after the mount has been positioned on the tool and positioned over an aperture on a surface to which the mount is intended to be applied.

FIG. 5 is an enlarged cross section of the nose of the tool and the mount of FIG. 4.

FIG. 6 is a top view of the mount of FIG. 5 after it has been applied to a surface with a predetermined force and the tool removed.

FIG. 7 is an enlarged cross section similar to FIG. 5 of an alternate embodiment.

PREFERRED EMBODIMENT FOR CARRYING OUT THE INVENTION

Figure 3:
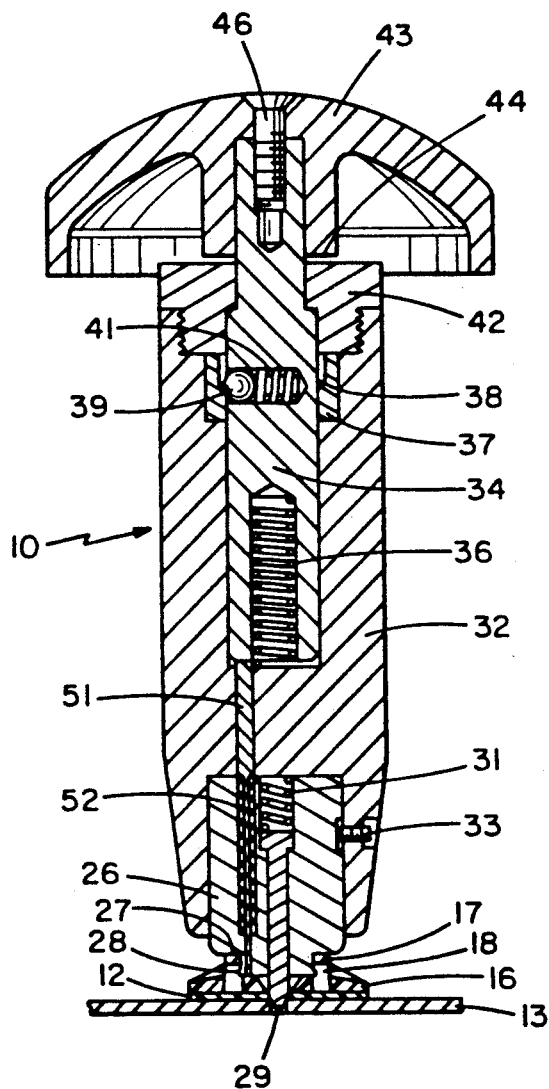
FIG. 3 is a cross section of the tool and mount of FIG. 2 showing a force applied to the tool and to the mount prior to application of a predetermined force to the mount.

An adhesive backed mount installation tool is generally indicated at 10 in the accompanying drawings. A mount for application by the installation tool 10 is shown generally at 11. The mount 11 as shown in FIG. 2 has adhesive backing 12 for securing the mount to a surface 13. One example of such a surface 13 would be a panel in an automobile where it is desired to run a plurality of wires and fasten the wires to the mount 12 by means of a cable tie, not shown. The surface 13 is shown with an aperture 14 therethrough whereby, if desired, the mount 11 could additionally be secured to the surface 13 by a screw or other suitable fastener. The mount 11 has a substantially planar base 16 and a spaced bridge portion 17 having a plurality of cable tie receiving apertures 18 extending therebetween. Referring to FIG. 6, a plurality of stiffening ribs 19 act as guides to the strap-receiving apertures 18. The mount 11 is further provided with a screw hole 21.

Referring now to FIG. 2, the tool 10 is provided with a nose 26 having an abutment surface 27 adapted to engage the bridge portion 17 of the mount 11. The nose 26 further has means for securing a mount to the tool comprising a plurality of bumps 28 which snap past the bridge portion 17 into the strap-receiving apertures 18 to secure the mount 11 to the tool 10 prior to installation. A centering pin 29 is biased by a spring 31 to project beyond the nose 26. When it is desired to position a mount 11 on the tool 10 the centering pin 29 is inserted through the screw hole 21 of the mount through the adhesive backing 12 whereby the engagement of the adhesive backing 12 and centering pin 29 comprises additional means for securing the mount in position relative to the tool 10. When it is desired to position the mount adjacent an aperture 14 in the surface 13, the centering pin 29 is positioned in the aperture to properly orient the mount 11 relative to the surface 13. If desired, a screw may be positioned through the mount into the aperture 14. When it is desired to position a mount 11 on an unapertured surface, the tool having the mount positioned thereon is placed against the unapertured surface whereby the centering pin 29 merely deflects the return spring 31 to allow the mount to be positioned flush with the surface 13.

The nose 26 of the tool 10 is shown as being square with a bump 28 on each side. It will be appreciated that the nose 26 could be round with means for securing a mount to the tool comprising an annular ring projecting outwardly from the nose 26 for engagement under the bridge portion 17.

The nose 26 is positioned in a housing 32 by means of a set screw 33. A plunger 34 is positioned in the housing 32 with a plunger return spring 36 biasing the plunger 34 away from the nose 26. A detent sleeve 37 having a ramp 38 is positioned in the housing 32 adjacent the plunger 34. A detent ball 39 is positioned in a bore in the plunger 34 and urged against the detent sleeve 37 by a detent ball return spring 41. End cap 42 maintains the plunger 34 positioned within the housing 32 for slidable movement relative thereto. A handle 43 having a stop surface 44 is suitably secured to the plunger by means of a handle screw 46. The stop surface 44 is spaced from the end cap 42 a sufficient distance to allow movement of the handle 43 relative to the housing 32. Upon application of a lateral force to the handle 43 the detent ball 39 engages the ramp 38 and retards movement of the plunger 34 relative to the housing 32.

Figure 4:
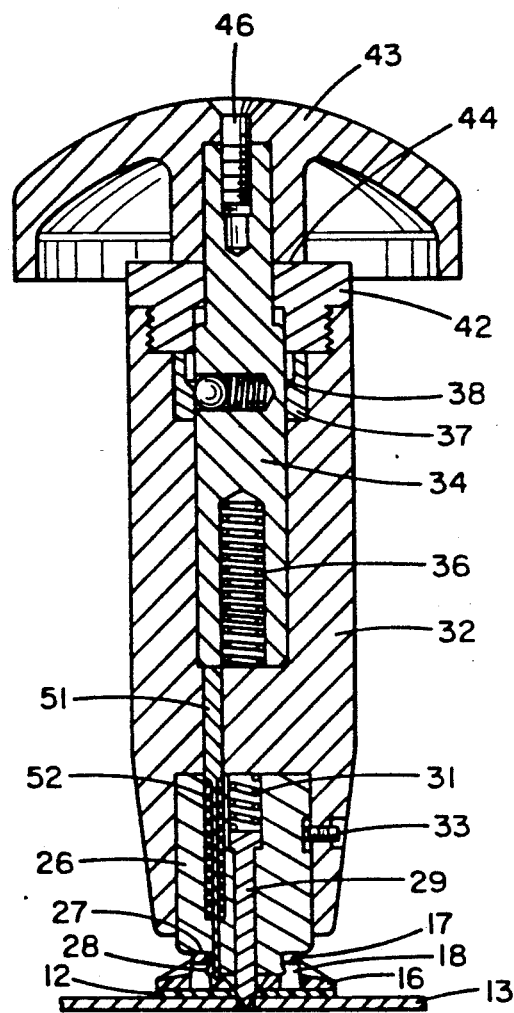
FIG. 4 is a cross section similar to FIG. 2 showing the tool after application of a predetermined force to the mount.

When additional force is applied to the handle 43, as shown in FIG. 3, the detent ball 39 will move inwardly against the force of the detent ball return spring 41 as the detent ball 39 moves down the detent sleeve ramp 38. As the force on the handle 43 is increased to disengage the detent ball 39 from the detent sleeve 37, the handle will move only against the force of the plunger return spring 36. Accordingly, if the detent ball return spring 41 is relatively stiff and the plunger return spring 36 relatively very elastic, once the detent ball overcomes the force of the detent ball return spring, the handle 43 moves very rapidly toward the end cap 42 with the stop surface 44 slamming against the end cap 42 to provide an audible noise to the operator. The tool provides means for indicating to the operator that the predetermined force has been applied as further movement of the handle relative to the housing is prevented after the audible engagement of stop surface 44 with end cap 42. Once the required seating force has been applied, the operator can cease applying lateral force to the handle. FIG. 4 shows the position of the tool parts after the application of a predetermined force sufficient to overcome the detent ball return spring force where the handle stop surface 44 is shown positioned against the end cap 42.

The plunger 34, detent sleeve 37, detent sleeve ramp 38, detent ball 39 and detent ball return spring 41 comprise means for applying a predetermined force to the mount 11. Movement of the plunger 34 is restrained until the predetermined force has been applied to the handle to overcome the force of the detent ball return spring 41. The predetermined force may be changed merely by changing the spring characteristics of the detent ball return spring 41. The size of the mount desired to be installed may require changing the predetermined force. Other mechanisms could be used to provide the desired predetermined force, for example, an impact mechanism used in center punch tools such as shown in Sweet U.S. Pat. No. 2,384,707 the disclosure of which is incorporated herein by reference. Other detent mechanisms such as toggle linkage could also be used.

When the handle stop surface 44 has bottomed on the end cap 42, the plunger 34 has moved the indentor pin 51 beyond the nose 26 of the tool into engagement with the mount 11. This movement of the indentor pin 51 will provide indicia in the form of an indent 53 in the mount once the predetermined force has been applied to the mount as best shown in FIG. 6. Accordingly, the plunger 34, indentor pin 51, and return spring 52 comprise means for transmitting to said mount indicia to indicate that the predetermined force has been applied.

FIG. 7 discloses an alternative embodiment wherein the nose of the installation tool is provided with a pivotable mount positioner 56 secured to the housing 57 by means of a retainer sleeve 58 and set screw 59. The retainer sleeve 58 has a flared arcuate end 61 which allows the pivotable mount positioner 56 to rotate relative to the housing 57. The mount positioner 56 is provided with bumps 62 adapted to be forced past the bridge portion 17 of the adhesive backed mount and hold the mount in place prior to installation. The mount positioner 56 also has indentor points 63 for indenting the mount to show that an installation tool was utilized to apply a predetermined force on the mount to secure it on the desired surface. The housing 57 is shown in phantom rotated to the right in FIG. 7 to illustrate that the housing may be rotated relative to the pivotable mount positioner 56 wherein it is not necessary to have the tool perpendicular to the surface 13 to which the mount is applied. The pivotable mount positioner allows the tool to be at an angle to the surface 13 and still maintain uniform contact between the mount positioner 56 and the bridge portion 17 of the mount.

What is claimed is:

1. The method of applying an adhesive backed mount to a surface comprising the following steps:
    positioning a mount on an application tool having a housing and a handle movable relative to said housing, wherein said handle has a stop surface positioned for preventing movement of said handle relative to said housing;
    positioning said mount in its desired location on a surface;
    applying a lateral force to said handle sufficient to overcome a predetermined force required to move said handle relative to said housing until said stop surface prevents further movement of said handle relative to said housing, thereby indicating that said predetermined lateral force has been applied to said mount; and
    ceasing application of the lateral force to said handle.

2. The method of claim 1 comprising the additional step of marking said mount to indicate said lateral force has been applied.

* * * * *